United States Patent
Zhang et al.

(10) Patent No.: US 10,634,480 B2
(45) Date of Patent: Apr. 28, 2020

(54) CENTRAL POINT POSITIONING DETERMINATION DEVICE AND CENTRAL POINT POSITIONING METHOD THEREOF FOR ROTOR COIL OF LARGE-SCALE STEAM TURBINE GENERATOR

(71) Applicant: SHANDONG GUTE ELECTRIC CO., LTD, Zibo (CN)

(72) Inventors: Yuewu Zhang, Zibo (CN); Juncheng Dong, Zibo (CN); Yuqing Wei, Zibo (CN); Kunpeng Tian, Zibo (CN); Pi'an Zhang, Zibo (CN)

(73) Assignee: SHANDONG GUTE ELECTRIC CO., LTD, Zibo (CN)

( * ) Notice: Subject to any disclaimer, the term of this patent is extended or adjusted under 35 U.S.C. 154(b) by 0 days.

(21) Appl. No.: 16/306,053

(22) PCT Filed: Jul. 26, 2016

(86) PCT No.: PCT/CN2016/091690
§ 371 (c)(1),
(2) Date: Nov. 30, 2018

(87) PCT Pub. No.: WO2017/215079
PCT Pub. Date: Dec. 21, 2017

(65) Prior Publication Data
US 2019/0368856 A1 Dec. 5, 2019

(30) Foreign Application Priority Data
Jun. 15, 2016 (CN) .......................... 2016 1 0429932

(51) Int. Cl.
*G01B 7/00* (2006.01)
(52) U.S. Cl.
CPC .................................. *G01B 7/003* (2013.01)

(58) Field of Classification Search
None
See application file for complete search history.

(56) References Cited

U.S. PATENT DOCUMENTS

| 4,303,883 A | * | 12/1981 | Mori | .................... B23K 9/1276 |
| | | | | 324/207.18 |
| 5,196,771 A | * | 3/1993 | Naito | ........................ H02P 6/10 |
| | | | | 318/400.36 |

(Continued)

FOREIGN PATENT DOCUMENTS

| CN | 101521482 A | 9/2009 |
| CN | 101915528 A | 12/2010 |

(Continued)

OTHER PUBLICATIONS

Abstract of CN 101915528 A (Year: 2010).*
Translation of KR 2010093429 (Year: 2010).*
Translation of JP-05130762-A (Year: 1993).*

*Primary Examiner* — Lina M Cordero
(74) *Attorney, Agent, or Firm* — Bayramoglu Law Offices LLC

(57) ABSTRACT

A central point positioning determination device and a central point positioning method thereof for a rotor coil of a large-scale steam turbine generator includes a control device, a pulse acquisition device, and a pulse generation device. The pulse generation device is connected to connection ends of a positive terminal and a negative terminal of the rotor of the generator, and a rotor body of the rotor. The control device controls the pulse generation device to send pulses to the positive terminal, the negative terminal, and the rotor body of the rotor of the generator. By doing so, the central point of the rotor coil can be found conveniently and quickly.

19 Claims, 3 Drawing Sheets

(56) References Cited

U.S. PATENT DOCUMENTS

| | | | | |
|---|---|---|---|---|
| 5,350,987 A * | 9/1994 | Ueki | ................ | H02P 6/185 318/400.4 |
| 5,747,996 A * | 5/1998 | Fuchs | ................ | G01B 7/004 324/207.17 |
| 2007/0299625 A1* | 12/2007 | Englert | ................ | A63B 24/0021 702/150 |
| 2008/0238218 A1* | 10/2008 | Lopatinsky | ................ | A63H 18/10 310/12.21 |
| 2010/0271012 A1* | 10/2010 | Patterson | ................ | G01B 7/004 324/207.15 |
| 2013/0106972 A1* | 5/2013 | Shumiya | ................ | B41J 2/471 347/118 |
| 2014/0077738 A1* | 3/2014 | Iwaji | ................ | H02P 27/08 318/400.36 |

FOREIGN PATENT DOCUMENTS

| | | | |
|---|---|---|---|
| CN | 104113257 A | | 10/2014 |
| CN | 105277835 A | | 1/2016 |
| CN | 105527537 A | | 4/2016 |
| GB | 2024322 B | | 4/1983 |
| JP | 05130762 A | * | 5/1993 |
| KR | 2010093429 | * | 9/2010 |
| WO | 2015052016 A1 | | 4/2015 |

* cited by examiner

CENTRAL POINT POSITIONING DETERMINATION DEVICE AND CENTRAL POINT POSITIONING METHOD THEREOF FOR ROTOR COIL OF LARGE-SCALE STEAM TURBINE GENERATOR

CROSS REFERENCE TO RELATED APPLICATIONS

This application is the national phase entry of International Application PCT/CN2016/091690, filed on Jul. 26, 2016 which is based upon and claims priority to Chinese Patent Application No. 201610429932.7, filed on Jun. 15, 2016 the entire contents of which are incorporated herein by reference.

TECHNICAL FIELD

The present invention provides a central point positioning determination device and a central point positioning method thereof for a rotor coil of a large-scale steam turbine generator which pertains to the field of electric machine fault detection devices.

BACKGROUND

Detection techniques of similar types available now can only reflect all the reflections of the incident waves of the positive and negative terminals, while the position of the central point cannot be reflected without any error. As a result, the position of the fault point cannot be determined. In a practical detection process, due to insufficient site conditions, the reference points cannot be manually shorted, thus the determinations of the locations of fault points are arbitrary, ambiguous, and inaccurate, and deviations will be caused in the determination. There are various situations for the inter-turn short circuit of rotor. In addition to the metallic inter-turn short circuit, there are other situations, such as different degrees of coil deformation, slight inter-turn short circuit, and ground fault, etc., which make the fault points hard to be found within a short time, and the faults cannot be eliminated.

SUMMARY

The objective of the present invention is to provide a central point positioning determination device and a central point positioning method thereof for a coil of a rotor of a large-scale steam turbine generator, so as to find the central point of the rotor coil, conveniently and quickly.

The central point positioning determination device for a coil of a rotor of a large-scale steam turbine generator according to the present invention includes a control device, a pulse acquisition device, and a pulse generation device. The pulse generation device is connected to connection ends of a positive terminal and a negative terminal of the rotor of the generator, and to a rotor body of the rotor of the generator. The control device controls the pulse generation device to send pulses to the positive terminal, the negative terminal, and the rotor body of the rotor of the generator.

According to the central point positioning determination device for the coil of the rotor of the large-scale steam turbine generator, the control device includes a human-machine interaction device for inputting and displaying, a central processing device for logic operation and control, and a high-speed timing control device for controlling pulse timing. Both the human-machine interaction device and the high-speed timing control device communicate with the central processing device through connections. The central processing device controls the pulse generation device to generate pulses through the high-speed timing control device.

According to the central point positioning determination device for the coil of the rotor of the large-scale steam turbine generator, the pulse generation device includes a quick pulse generator, a synchronous pulse generator, and a logic high-voltage switching switch combination unit. The quick pulse generator and the synchronous pulse generator simultaneously send pulses to the positive terminal and the negative terminal of the rotor of the generator with respect to the rotor body through the logic high-voltage switching switch combination unit.

According to the central point positioning determination device for the coil of the rotor of the large-scale steam turbine generator, the pulse acquisition device includes a pulse acquisitor and a digital-to-analog conversion storage device. The pulse acquisition device acquires waveforms on the coil of the rotor through the logic high-voltage switching switch combination unit. The pulse acquisition device and the high-speed timing control device output signals to the digital-to-analog conversion storage device for data conversion and data storage, and send the data back to the central processing device.

According to the central point positioning determination device for the coil of the rotor of the large-scale steam turbine generator, the central processing device establishes a communication link with a background real-time processor.

According to the central point positioning determination device for the coil of the rotor of the large-scale steam turbine generator, the logic high-voltage switching switch combination unit is connected to the connection ends of the positive terminal and the negative terminal, and the rotor body of the rotor of the generator, respectively.

The central point positioning method of the central point positioning determination device for the coil of the rotor of the large-scale steam turbine generator includes the following steps:

(1) sending, by the control device, a positive pulse to the connection end of the positive terminal or the connection end of the negative terminal of the coil of the rotor of the generator through the pulse generation device;

(2) acquiring, by the control device, a pulse signal through the pulse acquisition device and forming a waveform diagram A;

(3) simultaneously sending, by the control device, a same positive pulse to the connection ends of the positive terminal and the negative terminal of the coil of the rotor of the generator through the pulse generation device;

(4) acquiring, by the control device, a superposed waveform formed by the pulse signal through the pulse acquisition device and forming a waveform diagram B;

(5) superposing, by the control device, the waveforms of the waveform diagram A and the waveform diagram B, finding catastrophe point after a superposition of the waveform diagram A and the waveform diagram B, and forming a waveform diagram C; and (6) determining a location of the central point of the coil of the rotor according to an occurrence time of the catastrophe point.

Specifically, the central point positioning method includes the following steps:

simultaneously sending, by the control device, a positive pulse and a negative pulse to the connection ends of the positive terminal and the negative terminal of the coil of the rotor of the generator through the pulse generation device, with respect to the rotor body;

acquiring, by the control device, the pulse signal through the pulse acquisition device, and forming a waveform diagram D;

superposing, by the control device, the waveforms of the waveform diagram B and the waveform diagram D, and forming a waveform diagram E;

superposing, by the control device, the waveforms of the waveform diagram A, the waveform diagram B, and the waveform diagram D, and forming a waveform diagram F;

finding the catastrophe point according to superposed waveforms in the waveform diagram E and the waveform diagram F; and accurately determining the location of the central point of the coil of the rotor according to the occurrence time of the catastrophe point.

According to the central point positioning method, since the coil of the rotor of the generator is a rotor-type inductive line different from a balanced line (i.e. a normal conductive wire), when a positive pulse and a negative pulse are respectively sent from the positive terminal and the negative terminal, different from the balanced line where the waveforms superposed at the central point will offset each other, the waveforms of the coil of the rotor are superimposed at the central point to form a negative superposed pulse. This point is repeatedly verified by experiments.

Specifically, the central point positioning method of the central point positioning determination device for the rotor coil of the large-scale steam turbine generator includes the following steps:

(1) sending, by the control device, a positive pulse to the connection end of the positive terminal of the coil of the rotor of the generator through the pulse generation device, wherein, unlike a balanced line, where an open-circuit waveform is displayed when the positive pulse comes to the end, the positive pulse changelessly and endlessly continues in the coil of the rotor of the generator;

(2) acquiring, by the control device, the pulse signal through the pulse acquisition device and forming a waveform diagram A, wherein the waveform diagram A serves as a reference diagram;

(3) simultaneously sending, by the control device, a positive pulse and a negative pulse with opposite pulse strengths and opposite polarities to the connection ends of the positive terminal and the negative terminal of the coil of the rotor of the generator through the pulse generation device, wherein since the two opposite pulses arrive at the central point of the rotor at the same time, a superposition of the two opposite pulses will definitely occur at the central point of the coil;

(4) acquiring, by the control device, the waveform formed by the pulse signal through the pulse acquisition device, and forming a waveform diagram D;

(5) superposing, by the control device, the waveforms of waveform diagram A and waveform diagram D, wherein, a superposed waveform of the two opposite pulses is different from the waveform shown in the waveform diagram A, the waveforms of waveform diagram A and waveform diagram D are highly similar at a forepart, then a different point occurs, and the different point is the catastrophe point after the superposition of the two waveform diagrams, namely, the central point of the coil represented by a quantity of time, and a waveform diagram G is formed;

(6) determining the location of the central point of the coil of the rotor according to the occurrence time of the catastrophe point since a width and an amplitude of the pulse are given.

Compared with the prior art, the present invention has the following advantages.

According to the central point positioning determination device and the central point positioning method thereof for the coil of the rotor of the large-scale steam turbine generator of the present invention, pulses with the same polarity are sent to the positive terminal and the negative terminal of the coil of the rotor of the generator, respectively. Regarding the rotor-type loading, since the two pulses will arrive at the central point of the rotor at the same time, if the pulses are sent at the same time, the two pulses will definitely meet at the central point and form a superposed pulse, namely, a sudden change of the waveform. Pulses are unidirectionally sent to the positive terminal or negative terminal of the coil of the rotor of the generator with respect to the rotor body, simultaneously. There is no sudden change on the waveform diagram of the pulse sent to the positive terminal or negative terminal. Comparing the two waveform diagrams, before the central point, both of the waveforms do not change suddenly, and the two waveforms are quite similar. When reaching the central point, the waveforms of the pulses sent to the positive and negative terminals change suddenly, while the waveform of the pulse sent to the positive terminal or the negative terminal would not change suddenly. Accordingly, the two waveforms will have a large difference at the central point, and the point of the difference is the central point. By using a device capable of generating pulses, and a device capable of measuring the pulses, the center point can be found, then the position of the central point can be calculated based on the quantity of time by the control device. Further, the specific position of the fault point can be determined as the central point is determined.

In the figures: 1. human-machine interaction device; 2. high-speed timing control device; 3. digital-to-analog conversion storage device; 4. pulse acquisitor; 5. quick pulse generator; 6. rotor; 7. logic high-voltage switching switch combination unit; 8. synchronous pulse generator; 9. background real-time processor; 10. central processing device.

DETAILED DESCRIPTION OF THE EMBODIMENTS

The central point positioning determination device for a rotor coil of a large-scale steam turbine generator will be further described in combination of the present invention.

Figure 1:
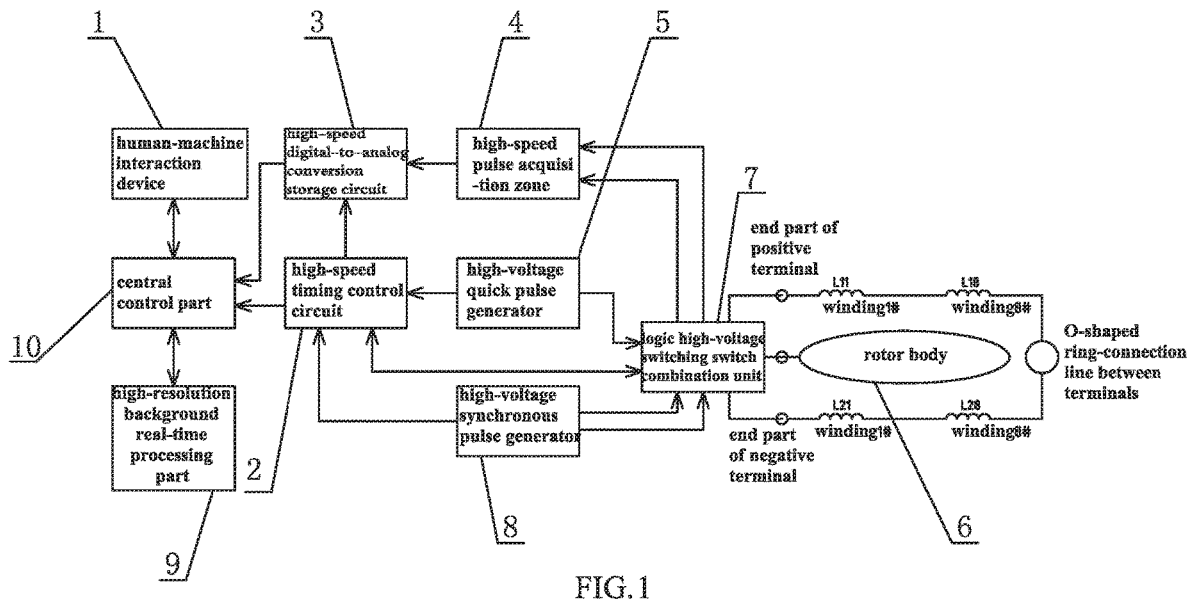
FIG. 1 is a schematic block diagram of the present invention.
Figure 2:
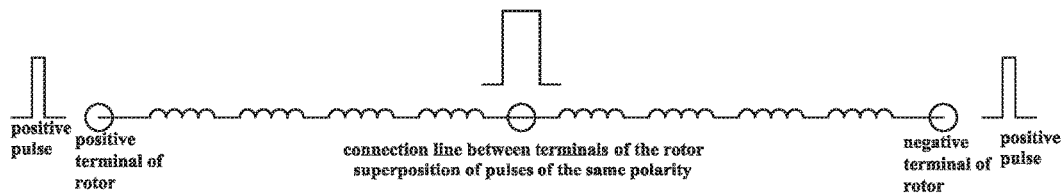
FIG. 2 is a schematic diagram of a waveform diagram B.
Figure 3:
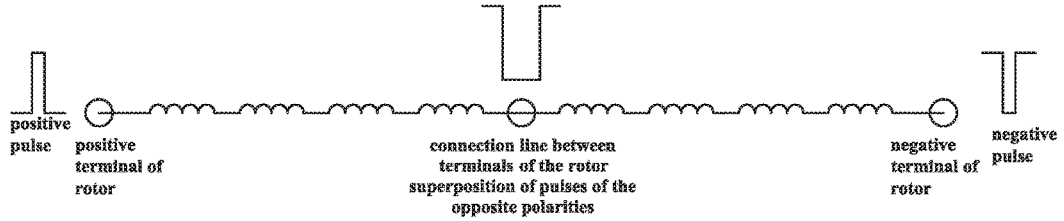
FIG. 3 is a schematic diagram of a waveform diagram D.
Figure 4:
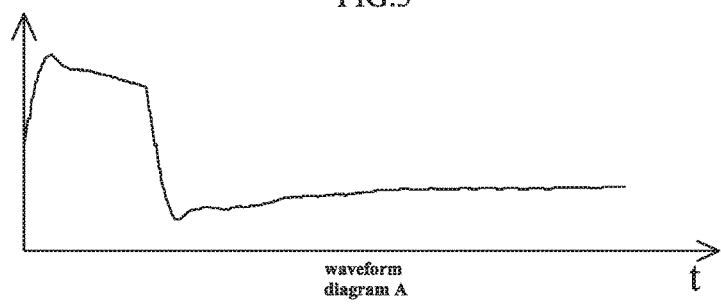
FIG. 4 is an oscillogram of a waveform diagram A.
Figure 5:
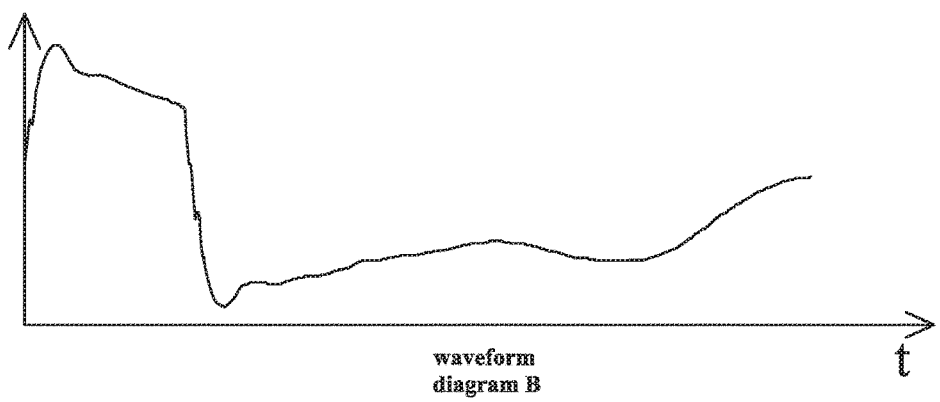
FIG. 5 is an oscillogram of a waveform diagram B.
Figure 6:
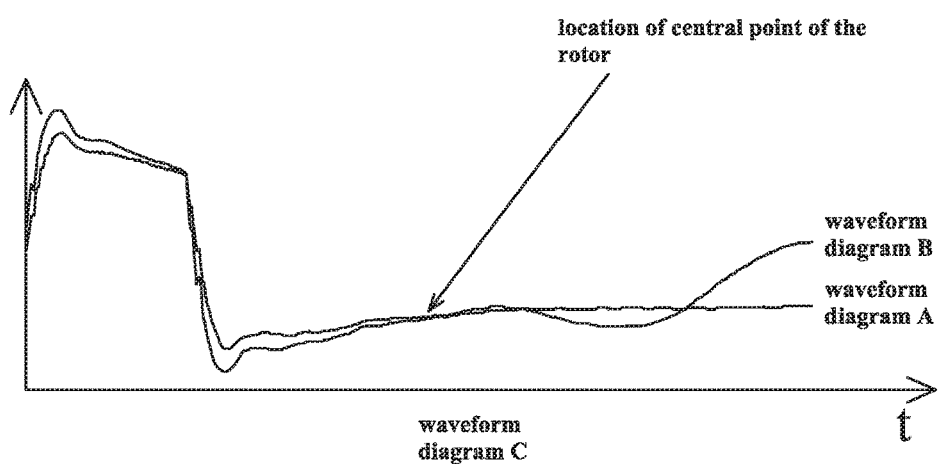
FIG. 6 is an oscillogram of a waveform diagram C.
Figure 7:
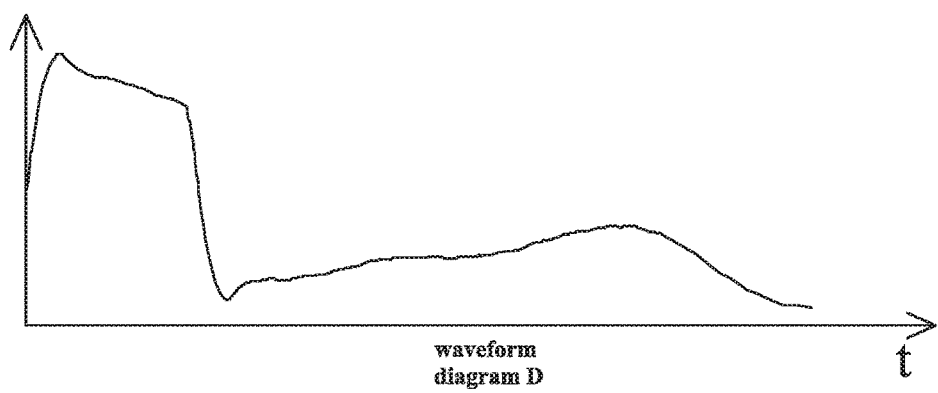
FIG. 7 is an oscillogram of a waveform diagram D.
Figure 8:
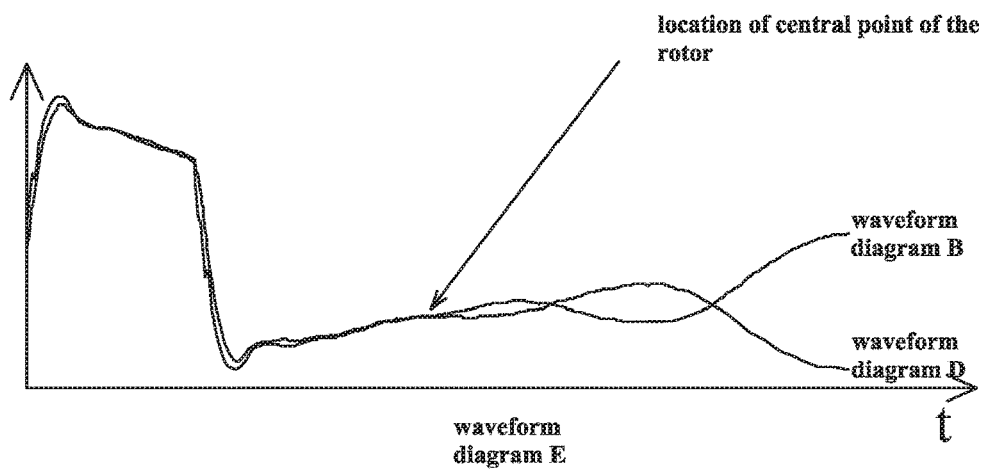
FIG. 8 is an oscillogram of a waveform diagram E.
Figure 9:
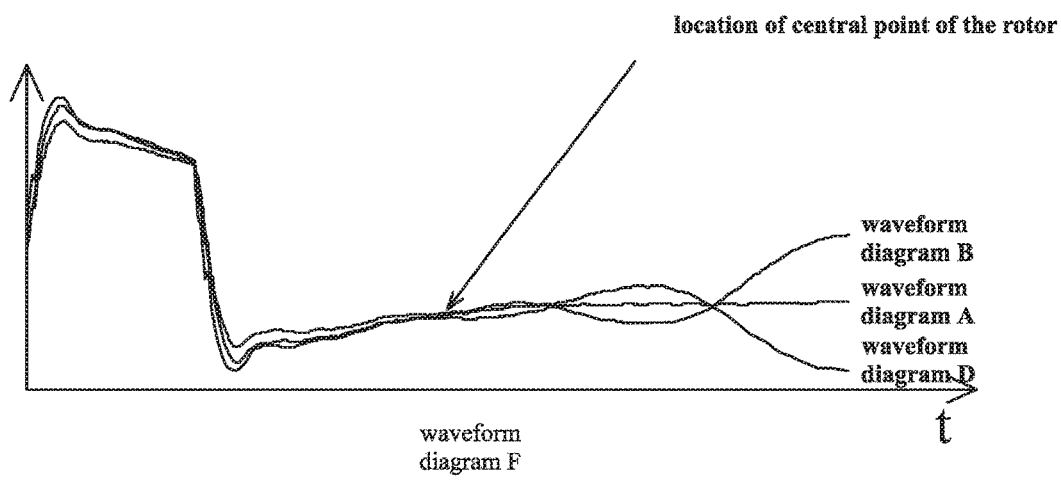
FIG. 9 is an oscillogram of a waveform diagram F.
Figure 10:
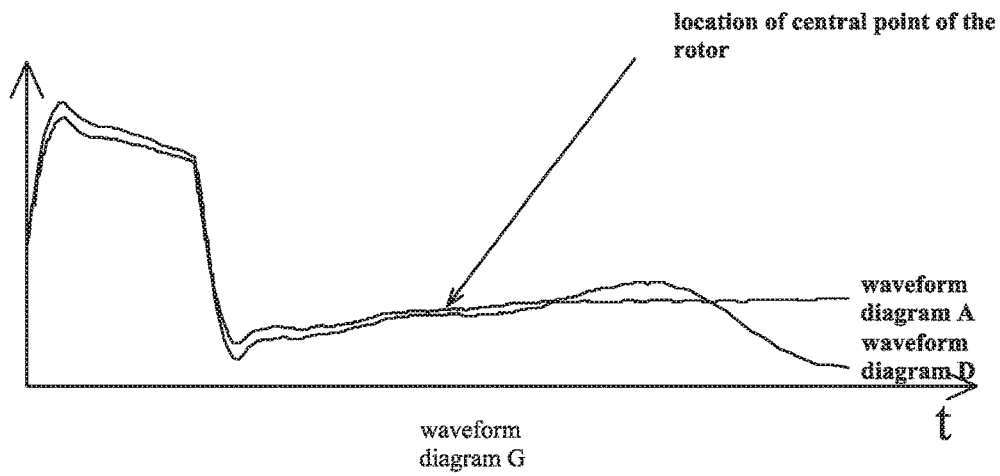
FIG. 10 is an oscillogram of a waveform diagram G.

As shown in FIG. 1, the central point positioning determination device for the rotor coil of the large-scale steam turbine generator of the present invention includes a control device, a pulse acquisition device, and a pulse generation device. The pulse generation device is connected to the connection ends of the positive and negative terminals of the rotor 6 of the generator, and to the rotor body. The control device controls the pulse generation device to send pulses to the positive and the negative terminals of the rotor 6 of the generator. The control device can control the pulse acquisition device and the pulse generation device according to the logic commands, so that the pulse generation device can send a signal to the positive terminal of the coil of the rotor 6 of the generator, and the pulse acquisition device can collect the waveform on the coil of the rotor 6. Again, the pulse generation device sends positive signals to the positive and the negative terminals of the coil of the rotor 6 of the generator, respectively, and the waveform on the coil of the rotor 6 is collected by the pulse acquisition device. Since the catastrophe point will appear at the central point when the pulses are sent to the positive and negative terminals simultaneously, the waveform for the case where pulses are sent to the positive and negative terminals with respect to the rotor body and the waveform for the case where only positive pulse is sent are different at the central point, so that the central point can be found in the waveform diagram.

According to the central point positioning determination device for the rotor coil of the large-scale steam turbine generator, the control device includes a human-machine interaction device 1 for input and display, a central processing device 10 for logic operation and control, and a high-speed timing control device 2 for controlling pulse timing. Both of the human-machine interaction device 1 and the high-speed timing control device 2 communicate with the central processing device 10 through connections. The central processing device 10 controls the pulse generation device to generate pulses through the high-speed timing control device 2.

According to the central point positioning determination device for the rotor coil of the large-scale steam turbine generator, the pulse generation device includes a quick pulse generator 5, a synchronous pulse generator 8, and a logic high-voltage switching switch combination unit 7. The quick pulse generator 5 and the synchronous pulse generator 8 send pulse signals to the positive and negative terminals of the rotor 6 of the generator through the logic high-voltage switching switch combination unit 7.

According to the central point positioning determination device for the rotor coil of the large-scale steam turbine generator, the pulse acquisition device includes a pulse acquisitor 4, a digital-to-analog conversion storage device 3. The pulse acquisition device collects the waveform on the coil of the rotor 6 through the logic high-voltage switching switch combination unit 7. The pulse acquisition device and the high-speed timing control device 2 output signals to the digital-to-analog conversion storage device 3 for data conversion and data storage, and send the data back to the central processing device 10.

According to the central point positioning determination device for the rotor coil of the large-scale steam turbine generator, the central processing device 10 establishes a communication link with the background real-time processor 9.

According to the central point positioning determination device for the rotor coil of the large-scale steam turbine generator, the logic high-voltage switching switch combination unit 7 is respectively connected to the connection ends of the positive and negative terminals of the rotor 6 of the generator and the rotor body of the rotor 6.

The central point positioning method will be further described below in combination of the present invention.

Embodiment 1: as shown in FIGS. 2-9, the central point positioning method specifically includes the following steps.

(1) A positive pulse is sent to the connection end of the positive terminal of the coil of the rotor 6 of the generator through the pulse generation device by the control device. Unlike a balanced line, where an open-circuit waveform is displayed when the positive pulse comes to the end, the positive pulse changelessly and endlessly continues in the coil of the rotor 6 of the generator.

(2) The pulse signal is collected through the pulse acquisition device by the control device and a waveform diagram A is formed. The waveform diagram A serves as a reference diagram.

(3) Positive pulses with the same pulse strengths and polarities are simultaneously sent to the connection ends of the positive terminal and the negative terminal of the coil of the rotor 6 of the generator through the pulse generation device by the control device. Since the two positive pulses arrive at the central point of the rotor at the same time, a superposition of the two positive pulses will definitely occur at the central point of the coil.

(4) The waveform formed by the pulse signal is collected through the pulse acquisition device by the control device and a waveform diagram B is formed.

(5) The waveforms of the waveform diagram A and the waveform diagram B are superposed by the control device. A superposed waveform of the two positive pulses is different from the waveform shown in the waveform diagram A. The waveforms of waveform diagram A and waveform diagram B are highly similar at a forepart, then a different point occurs, and the different point is the catastrophe point after the superposition of the two waveform diagrams. Namely, the central point of the coil is represented by a quantity of time, and a waveform diagram C is formed.

(6) The location of the central point of the coil of the rotor 6 can be determined according to the occurrence time of the catastrophe point since the width and amplitude of the pulse are given.

Embodiment 2: as shown in FIGS. 2-10, the central point positioning method specifically includes the following steps.

(1) A positive pulse is sent to the connection end of the positive terminal of the coil of the rotor 6 of the generator through the pulse generation device by the control device. Unlike a balanced line, where an open-circuit waveform is displayed when the positive pulse comes to the end, the positive pulse changelessly and endlessly continues in the coil of the rotor 6 of the generator.

(2) The pulse signal is collected through the pulse acquisition device by the control device and a waveform diagram A is formed. The waveform diagram A serves as a reference diagram.

(3) A positive pulse and a negative pulse with opposite pulse strengths and polarities are simultaneously sent to the connection ends of the positive terminal and the negative terminal of the coil of the rotor 6 of the generator through the pulse generation device by the control device. Since the two opposite pulses arrive at the central point of the rotor at the same time, a superposition of the two opposite pulses will definitely occur at the central point of the coil.

(4) The waveform formed by the pulse signal is collected through the pulse acquisition device by the control device and a waveform diagram D is formed.

(5) The waveforms of the waveform diagram A and the waveform diagram D are superposed by the control device. A superposed waveform of the two opposite pulses is different from the waveform shown in the waveform diagram A. The waveforms of the waveform diagram A and the waveform diagram D are highly similar at a forepart, then a different point occurs, and the different point is the catastrophe point after the superposition of the two waveform diagrams. Namely, the central point of the coil is represented by a quantity of time, and a waveform diagram G is formed.

(6) The location of the central point of the coil of the rotor 6 can be determined according to the occurrence time of the catastrophe point since the width and amplitude of the pulse are given.

Embodiment 3: the central point positioning method specifically includes the following steps.

(1) A positive pulse is sent to the connection end of the positive terminal of the coil of the rotor 6 of the generator through the pulse generation device by the control device.

(2) A pulse signal is collected through the pulse acquisition device by the control device and a waveform diagram A is formed.

(3) Same positive pulses are simultaneously sent to the connection ends of the positive terminal and the negative terminal of the coil of the rotor 6 of the generator through the pulse generation device by the control device.

(4) A superposed waveform formed by the pulse signal is collected through the pulse acquisition device by the control device and a waveform diagram B is formed.

(5) The control device sends a positive pulse to the connection end of the positive terminal of the coil of the rotor 6 of the generator through the pulse generation device, and sends a negative pulse to the connection end of the negative terminal. The positive pulse and the negative pulse are superposed to form a superposed negative pulse.

(6) The control device collects the superposed waveform formed by the pulse signal through the pulse acquisition device, and a waveform diagram D is formed.

(7) The control device superposes the waveforms of the waveform diagram B and the waveform diagram D to find the catastrophe point in a waveform diagram E.

(8) The control device superposes the waveforms of the waveform diagram A, the waveform diagram B and the waveform diagram D to find the waveform diagram F formed by the waveforms of the waveform diagram A, waveform diagram B, and waveform diagram D, so that the catastrophe point can be clearly found after the superposition. Based on Embodiment 1, a reference waveform is further added. The waveform diagram B shows a superposed positive pulse, and waveform diagram D shows a superposed negative pulse. The two pulses change suddenly at the same moment with respect to waveform diagram A while the directions of the sudden changes are different, so that the catastrophe point can be found more accurately, and the positioning of the central point is more accurate.

(9) The position of the central point of the coil of the rotor 6 is determined according to the occurrence time of the sudden change, see waveform diagram F.

What is claimed is:

1. A positioning determination device for a coil of a rotor of a steam turbine generator, comprising:
a control device, a pulse acquisition device, and a pulse generation device;
wherein, the pulse generation device is connected to connection ends of a positive terminal and a negative terminal of the rotor of the generator, and to a rotor body of the rotor of the generator; and
the control device controls the pulse generation device to send pulses to the positive terminal, the negative terminal, and the rotor body of the rotor of the generator.

2. The positioning determination device for the coil of the rotor of the steam turbine generator of claim 1,
wherein, the control device comprises a human-machine interaction device for inputting and displaying, a central processing device for logic operation and control, and a timing control device for controlling pulse timing;
wherein, both of the human-machine interaction device and the timing control device communicate with the central processing device through connections; and
the central processing device controls the pulse generation device to generate pulses through the timing control device.

3. The positioning determination device for the coil of the rotor of the steam turbine generator of claim 2,
wherein, the pulse generation device comprises a pulse generator, a synchronous pulse generator, and a logic switching switch combination unit;
wherein, the pulse generator and the synchronous pulse generator simultaneously send pulses to the positive terminal and the negative terminal of the rotor of the generator with respect to the rotor body through the logic switching switch combination unit.

4. The positioning determination device for the coil of the rotor of the steam turbine generator of claim 3,
wherein, the pulse acquisition device comprises a pulse acquisitor and a digital-to-analog conversion storage device;
wherein, the pulse acquisition device acquires waveforms on the coil of the rotor through the logic switching switch combination unit; and
the pulse acquisition device and the timing control device output signals to the digital-to-analog conversion storage device for data conversion and data storage, and send the data back to the central processing device.

5. The positioning determination device for the coil of the rotor of the steam turbine generator of claim 4,
wherein, the central processing device establishes a communication link with a background real-time processor.

6. The positioning determination device for the coil of the rotor of the steam turbine generator of claim 5,
wherein, the logic switching switch combination unit is connected to the connection ends of the positive terminal and the negative terminal, and to the rotor body of the rotor of the generator, respectively.

7. A positioning method for the positioning determination device of claim 1, comprising:
sending, by the control device, a positive pulse to the connection end of the positive terminal or the connection end of the negative terminal of the coil of the rotor of the generator through the pulse generation device;
acquiring, by the control device, a pulse signal through the pulse acquisition device and forming a waveform diagram A;
simultaneously sending, by the control device, same positive pulses to the connection ends of the positive terminal and the negative terminal of the coil of the rotor of the generator through the pulse generation device;
acquiring, by the control device, a superposed waveform formed by the pulse signal through the pulse acquisition device and forming a waveform diagram B;
superposing, by the control device, waveforms of the waveform diagram A and the waveform diagram B, finding a catastrophe point after a superposition of the waveform diagram A and the waveform diagram B, and forming a waveform diagram C; and determining a location of the central point of the coil of the rotor according to an occurrence time of the catastrophe point.

8. The positioning method of claim 7, further comprising:
simultaneously sending, by the control device, a positive pulse and a negative pulse to the connection ends of the positive terminal and the negative terminal of the coil of the rotor of the generator through the pulse generation device, with respect to the rotor body;
acquiring, by the control device, the pulse signal through the pulse acquisition device, and forming a waveform diagram D;
superposing, by the control device, waveforms of the waveform diagram B and the waveform diagram D, and forming a waveform diagram E;
superposing, by the control device, the waveforms of the waveform diagram A, the waveform diagram B, and the waveform diagram D, and forming a waveform diagram F;
finding the catastrophe point according to superimposed waveforms in the waveform diagram E and the waveform diagram F; and
accurately determining the location of the central point of the coil of the rotor according to the occurrence time of the catastrophe point.

9. The positioning method for the positioning determination device of claim 7, wherein,
the control device comprises a human-machine interaction device for inputting and displaying, a central processing device for logic operation and control, and a timing control device for controlling pulse timing;
wherein, both of the human-machine interaction device and the timing control device communicate with the central processing device through connections; and
the central processing device controls the pulse generation device to generate pulses through the timing control device.

10. The positioning method for the positioning determination device of claim 9, wherein,
the pulse generation device comprises a pulse generator, a synchronous pulse generator, and a logic switching switch combination unit;
wherein, the pulse generator and the synchronous pulse generator simultaneously send pulses to the positive terminal and the negative terminal of the rotor of the generator with respect to the rotor body through the logic switching switch combination unit.

11. The positioning method for the positioning determination device of claim 10, wherein,
the pulse acquisition device comprises a pulse acquisitor and a digital-to-analog conversion storage device;
wherein, the pulse acquisition device acquires waveforms on the coil of the rotor through the logic switching switch combination unit; and
the pulse acquisition device and the timing control device output signals to the digital-to-analog conversion storage device for data conversion and data storage, and send the data back to the central processing device.

12. The positioning method for the positioning determination device of claim 11, wherein,
the central processing device establishes a communication link with a background real-time processor.

13. The positioning method for the positioning determination device of claim 12, wherein, the logic switching switch combination unit is connected to the connection ends of the positive terminal and the negative terminal, and to the rotor body of the rotor of the generator, respectively.

14. A positioning method for the positioning determination device of claim 1, comprising:
sending, by the control device, a positive pulse to the connection end of the positive terminal of the coil of the rotor of the generator through the pulse generation device, wherein, unlike a balanced line, where an open-circuit waveform is displayed when the positive pulse comes to the end, the positive pulse changelessly and endlessly continues in the coil of the rotor of the generator;
acquiring, by the control device, a pulse signal through the pulse acquisition device and forming a waveform diagram A, wherein the waveform diagram A serves as a reference diagram;
simultaneously sending, by the control device, a positive pulse and a negative pulse with opposite pulse strengths and opposite polarities to the connection ends of the positive terminal and the negative terminal of the coil of the rotor of the generator through the pulse generation device, wherein since the two opposite pulses arrive at the central point of the rotor at the same time, a superposition of the two opposite pulses will definitely occur at the central point of the coil;
acquiring, by the control device, a waveform formed by the pulse signal through the pulse acquisition device and forming a waveform diagram D;
superposing, by the control device, waveforms of the waveform diagram A and the waveform diagram D, wherein, the waveforms of the waveform diagram A and the waveform diagram D are highly similar at a forepart, then a different point occurs, and the different point is a catastrophe point after the superposition of the waveforms of the waveform diagram A and the waveform diagram D, namely, the central point of the coil represented by a quantity of time, and a waveform diagram G is formed by superposing the waveform diagram A and the waveform diagram D; and
determining a location of the central point of the coil of the rotor according to an occurrence time of the catastrophe point since a width and an amplitude of the pulse are given.

15. The positioning method for the positioning determination device of claim 14, wherein,
the control device comprises a human-machine interaction device for inputting and displaying, a central processing device for logic operation and control, and a timing control device for controlling pulse timing;
wherein, both of the human-machine interaction device and the timing control device communicate with the central processing device through connections; and
the central processing device controls the pulse generation device to generate pulses through the timing control device.

16. The positioning method for the positioning determination device of claim 15, wherein,
the pulse generation device comprises a pulse generator, a synchronous pulse generator, and a logic switching switch combination unit;
wherein, the pulse generator and the synchronous pulse generator simultaneously send pulses to the positive terminal and the negative terminal of the rotor of the generator with respect to the rotor body through the logic switching switch combination unit.

17. The positioning method for the positioning determination device of claim 16, wherein,
the pulse acquisition device comprises a pulse acquisitor and a digital-to-analog conversion storage device;
wherein, the pulse acquisition device acquires waveforms on the coil of the rotor through the logic switching switch combination unit; and
the pulse acquisition device and the timing control device output signals to the digital-to-analog conversion storage device for data conversion and data storage, and send the data back to the central processing device.

18. The positioning method for the positioning determination device of claim 17, wherein,
the central processing device establishes a communication link with a background real-time processor.

19. The positioning method for the positioning determination device of claim 18, wherein,
the logic switching switch combination unit is connected to the connection ends of the positive terminal and the negative terminal, and to the rotor body of the rotor of the generator, respectively.

* * * * *